U

United States Patent [19]

Miller

[11] Patent Number: 4,673,487

[45] Date of Patent: Jun. 16, 1987

[54] HYDROGENATION OF A HYDROCRACKATE USING A HYDROFINISHING CATALYST COMPRISING PALLADIUM

[75] Inventor: Stephen J. Miller, San Francisco, Calif.

[73] Assignee: Chevron Research Company, San Francisco, Calif.

[21] Appl. No.: 826,941

[22] Filed: Feb. 6, 1986

Related U.S. Application Data

[62] Division of Ser. No. 671,139, Nov. 13, 1984, Pat. No. 4,601,996.

[51] Int. Cl.$^4$ ................... C10G 47/14; C10G 65/12
[52] U.S. Cl. .................................. 208/58; 208/18; 208/61; 208/143; 208/97
[58] Field of Search ............... 208/58, 59, 18, 143, 208/97, 57, 61

[56] References Cited

U.S. PATENT DOCUMENTS

| | | | |
|---|---|---|---|
| 3,399,132 | 8/1968 | Mulaskey | 502/242 |
| 3,542,696 | 11/1970 | Mulaskey | 502/222 |
| 3,917,566 | 11/1975 | Scott et al. | 208/251 R |
| 3,962,071 | 6/1976 | Itoh et al. | 208/58 |
| 4,162,962 | 7/1979 | Stangeland | 208/18 |
| 4,325,805 | 4/1982 | Miller | 208/58 |
| 4,370,219 | 1/1983 | Miller | 208/66 |

Primary Examiner—Andrew H. Metz
Assistant Examiner—Anthony McFarlane
Attorney, Agent, or Firm—S. R. LaPaglia; W. K. Turner; V. J. Cavalieri

[57] ABSTRACT

An improved nickel-tin hydrogenation catalyst additionally comprising palladium provides a highly active catalyst more easily activated than conventional nickel hydrogenation catalysts, and a process employing the improved catalyst to stabilize lubricating oils to ultraviolet radiation is disclosed.

6 Claims, 1 Drawing Figure

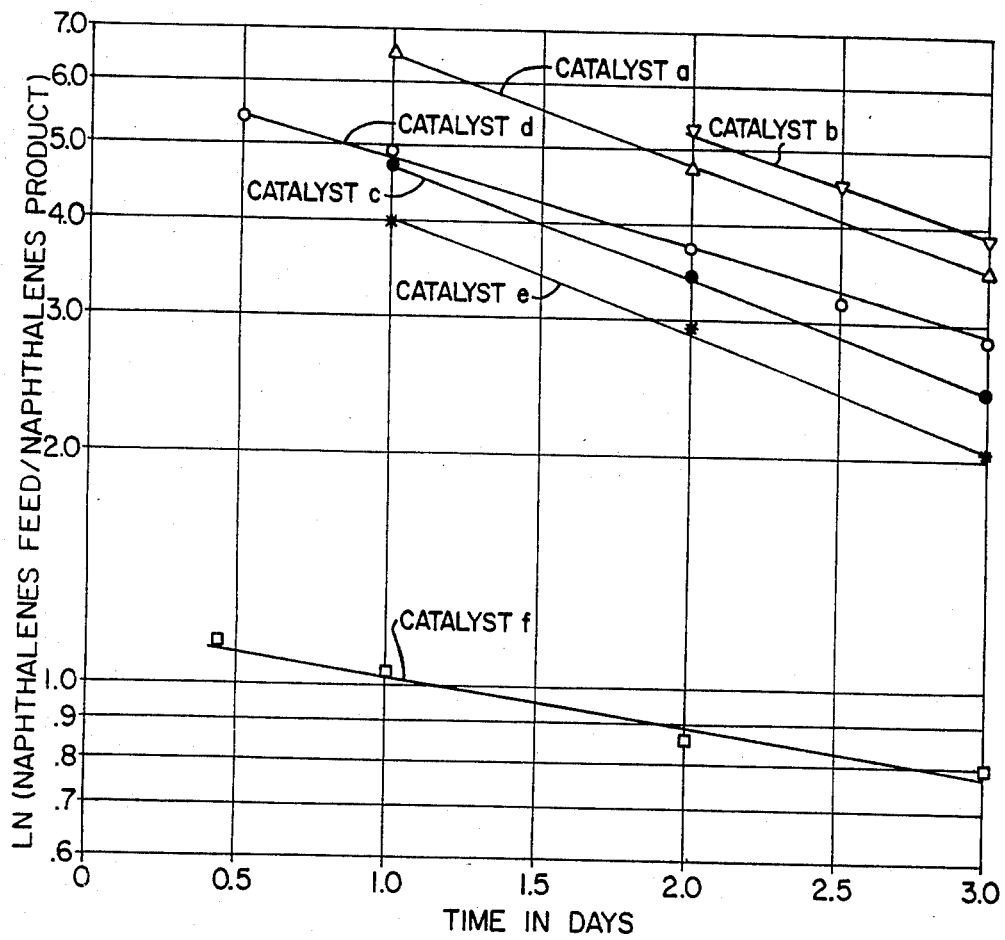
FIG._1.

HYDROGENATION OF A HYDROCRACKATE USING A HYDROFINISHING CATALYST COMPRISING PALLADIUM

This is a division of application Ser. No. 671,139, filed 11/13/84, now U.S. Pat. No. 4,601,996.

BACKGROUND OF THE INVENTION

There is a continuing effort to develop improved hydrogenation catalysts which can be used to stabilize lubricating oils. U.S. Pat. No. 4,325,805, granted on Apr. 20, 1982, summarizes advances resulting from recent efforts. According to that patent, the oxidative stability of catalytically dewaxed hydrocrackates was greatly improved by hydrogenation in the presence of a nickel-tin hydrogenation catalyst.

Like many state-of-the-art catalysts, the catalysts described in U.S. Pat. No. 4,325,805 are activated prior to use by reducing the oxidation state of the nickel component. Typically, the reduction was carried out by raising the catalyst to a relatively high temperature, on the order of 700° F. to 800° F. in the presence of hydrogen. However, if these temperatures are reached too rapidly the catalyst can sinter and consequently deactivate.

Accordingly, it is the principle object of the present invention to provide an improved catalyst which is more easily activated than similar conventional catalysts, and yet retains high catalytic activity when used in hydrofinishing processes to stabilize hydrocracked lubricating oils.

SUMMARY OF THE INVENTION

The essence of the present invention resides in the discovery that nickel-tin hydrofinishing catalysts having a siliceous matrix used to stabilize lubricating oils hydrocrackate can be improved by adding palladium to the catalyst. The amount of palladium metal added ranges from about 0.03 weight percent to about 1.0 weight percent.

BRIEF DESCRIPTION OF THE FIGURE

The Figure accompanying the Detailed Description which follows graphically illustrates the advantage of the catalyst of the present invention relative to representative commercially available catalysts.

DETAILED DESCRIPTION OF THE INVENTION

The nickel-tin hydrogenation catalysts having a siliceous matrix which are improved by adding palladium according to the present invention are well-known catalysts. For example, U.S. Pat. No. 3,399,132, granted on Aug. 27, 1968, and U.S. Pat. No. 3,542,696, granted on Nov. 24, 1970, describe suitable nickel-tin hydrogenation catalysts and their preparation. However, any nickel-tin hydrogenation catalyst with a siliceous matrix is suitable.

The preferred catalysts comprise a coprecipitated composite of catalytically active amounts of nickel and tin, or compounds thereof, and a porous inorganic oxide. The coprecipitated composite can be prepared by the coprecipitation or cogelation of a mixture of compounds of the hydrogenating metals, that is nickel and tin, and compounds of the metals or nonmetals whose oxides form the siliceous carrier.

It is the usual practice to activate the foregoing nickel-tin catalysts when they are intended for use as hydrogenation catalysts to stabilize lubricating oils by contacting the catalyst with hydrogen under nickel-reducing conditions. Suitable reducing conditions include gradually increasing the temperature of the contact zone to a temperature from about 700° F. to about 800° F. If properly carried out the resulting catalyst is an active hydrogenation catalyst particularly useful in lubricating oil stabilizing processes. However, it has been found that if the activation procedure is not carefully controlled, for example, proceeds too rapidly, the catalyst will deactivate probably due to sintering. Unfortunately, careful control of the activation procedure is not a simple matter.

It has been found that greater simplicity in the activation procedure, and therefore fewer instances of deactivation, can be achieved by adding critical amounts of palladium or a compound thereof to the nickel-tin catalysts. This discovery should not be confused with the conventional use of noble metal containing hydrogenation catalysts, such as palladium catalysts, in lubricating oil hydrofinishing processes. U.S. Pat. No. 3,962,071 granted June 8, 1976 is typical of those conventional processes. According to the disclosure in that patent, catalysts comprising palladium supported on a silica-containing refractory inorganic oxide carrier are useful hydrogenation catalysts in lubricating oil hydrofinishing processes. Palladium catalysts were, in fact, compared to the nickel-tin catalysts improved as a result of the discovery embodied by the present invention in U.S. Pat. No. 4,325,805 mentioned above. Thus, the use of nickel-tin catalysts in lubricating oil hydrofinishing processes was investigated as an alternative to the use of palladium catalysts, and was found superior in some respects. In contrast to these investigations directed toward alternative catalysts, the present invention resulted from an investigation of the benefits of adding palladium as an additional component to the nickel-tin catalyst.

From this investigation, the addition of palladium was found to achieve significant benefits. The amount of palladium added to the catalyst has been found to be an important consideration. In order to achieve the benefits of the present invention, palladium should be added in an amount ranging from about 0.03 weight percent of metal to about 1.0 weight percent of metal as a percentage of the total weight of catalyst. Generally, an amount of palladium within this range and in excess of about 0.3 weight percent is preferred, about 0.8 weight percent is especially preferred. Adding less than about 0.03 weight percent of palladium does not provide significant benefits. Adding greater than about 1.0 weight percent of palladium does not improve on the benefits already obtained, and is therefore economically disadvantageous although an excess is not detrimental to performance of the catalyst.

The palladium component of the improved nickel-tin hydrogenation catalyst can be added either during preparation of the nickel-tin catalyst by conventional coprecipitation of cogelation methods or subsequently by conventional impregnation methods. Thus, for example, catalysts of the present invention can be prepared by coprecipitating or cogelling a mixture of compounds of the metals and a compound of silicon. Other compounds of metals or nonmetals, or both, whose oxides form an inorganic oxide carrier, can also be present in the mixture to be coprecipitated. For example, a compound of the metals or nonmetals, or both, of Groups II through VI of the Periodic Table can be present. Accordingly, in the finished coprecipitated composite, in addition to tin, nickel, and palladium, or compounds of these metals, and silica being present, there may also be alumina, magnesia, titania, zirconia, and combinations thereof. Thus, the coprecipitated composite can comprise a siliceous matrix including, by way of example, silica-alumina, silica-magnesia, silica-zirconia, silica-magnesia-titania, and silica-alumina-zirconia. Silica-alumina is particularly preferred. The siliceous oxide should comprise at least about 30 weight percent silica, preferably 30 to 99 weight percent silica, and more preferably 30 to 75 weight percent silica.

As indicated above, the catalytic compositions of the present invention must have nickel or compounds thereof, tin or compounds thereof, and palladium or compounds thereof in association with the coprecipitated siliceous matrix. The metals can be introduced by impregnation, ion exchange, etc., but it is particularly preferred that the nickel and tin be introduced as part of the coprecipitate and the palladium be introduced by impregnation.

Preferably, in addition to the added palladium or palladium compound, the catalysts will comprise nickel and tin, or compounds thereof, in an amount from 5 to 30 combined weight percent and still more preferably from 7 to 25. The nickel and tin, or compounds thereof, should be present in the catalyst in a weight ratio of nickel to tin of from 0.25 to 20, determined as the metals. Preferably, the nickel to tin weight ratio is from 0.5 to 20 and more preferably 0.5 to 10. In general, when using high combined weights of nickel and tin, it is preferred to use high nickel to tin weight ratios.

The nickel and tin can be in the metallic form, or in compound form, such as, for example, the oxide or sulfide form. The oxide form is especially preferred. However, any compounds of the metals which perform as hydrogenating components can be used in the catalyst.

The coprecipitated composite should preferably have a high surface area, that is, a surface area greater than 50 $m^2/gm$ and preferably greater than 150 $m^2/gm$. Generally, the coprecipitated composite should have a surface area of from 50-700 $m^2/gm$.

Palladium can be impregnated into the composite comprising nickel and tin using the same method described in U.S. Pat. No. 3,962,071 mentioned above and incorporated herein. In the method disclosed in that patent, a palladium compound is dissolved in an excess of water in an amount calculated to provide the desired amount of palladium in the final catalyst product. This solution is then added to the aluminosilicate nickel-tin catalyst with stirring, and after a sufficient time has elapsed the product is separated by filtration and dried. Suitable palladium solutions can be prepared from soluble palladium metal salts.

The resulting nickel-tin hydrogenation catalyst additionally comprising palladium is preferably activated by contact with hydrogen at an elevated temperature. It has been found that activation can be carried out at temperatures significantly below those required for nickel-tin catalysts generally. In most instances, activation can be carried out by heating to temperatures within the range of from about 450° F. to about 850° F., preferably within the range of from about 500° F. to about 800° F. Although a separate activation is sometimes employed, it is also common practice to integrate activation with hydrogenation. The present invention contemplates either practice.

Although for purposes of the present invention it is not necessary or preferable to sulfide the nickel-tin catalyst prior to use, it is a common practice. If sulfiding is carried out, the sulfided catalyst contain at least 0.2 weight percent sulfur. The sulfiding can be accomplished prior to contacting the hydrocarbon feed with the catalyst under hydrocarbon hydroconversion conditions, as by contacting the catalyst comprising nickel and tin, or compounds thereof, with a sulfur-affording gas, for example, hydrogen sulfide, under conditions to result in sulfiding of the hydrogenating metals, i.e., nickel and tin. Other sulfur-affording gases include mixtures of hydrogen and $H_2S$ and mixtures of hydrogen with organic sulfur compounds reducible to $H_2S$ at the sulfiding conditions employed. Generally, the catalyst temperature during sulfiding is controlled below 850° F. and preferably below 750° F. Good results can be obtained by contacting the catalyst with a mixture of hydrogen and vaporized organic compounds of dimethyldisulfide, isopropyl mercaptan, or carbon disulfide at temperatures in the range of 450° F. to 650° F. However, it has been found that while sulfiding a nickel-tin catalyst is generally considered to provide a superior hydrofinishing catalyst, an unsulfided catalyst provides better oxidation stability. Nonetheless, in the event that a sulfided catalyst is the catalyst of choice, the present invention encompasses such catalysts. Sulfided catalysts may be activated by contact with a stream of hydrogen prior to sulfiding.

The form in which the catalyst is used will depend on the type of process involved in the hydroconversion operation, that is, whether the process involves a fixed bed, moving bed, or a fluid operation. Generally, the catalyst will exist in the form of beads, tablets, pellets, spheroidal particles, or extruded particles for use in fixed bed or moving bed operations; whereas in a fluidized bed operation, the catalyst will generally exist in a finely-divided or powder form. The catalytic composition can be mixed with a support or binder, if desired, to provide beneficial properties, such as increased compactibility or attrition resistance. The particular chemical composition of the support or binder is not critical. It is, however, necessary that the support or binder employed be thermally stable under the conditions at which hydrogenation process is carried out.

The improved catalysts resulting from the discovery embodied in the present invention are intended for use in the process for preparing lubricating oil stocks described in U.S. Pat. No. 4,325,805 mentioned above. In general, the process comprises:

(a) hydrocracking in a hydrocracking zone a hydrocarbonaceous feedstock;

(b) optionally dewaxing in a dewaxing zone at least part of the effluent of said hydrocracking zone; and (c) catalytically hydrogenating in a catalytic hydrogenation zone at least part of the effluent of said hydrocracking zone by contacting at least part of said hydrocracking zone effluent with a catalyst comprising nickel, or a compound thereof, tin, or a compound thereof, a siliceous matrix, and palladium, or a compound thereof.

The hydrocarbonaceous feeds from which lube oils are made usually contain aromatic compounds as well as normal an branched paraffins of very long chain lengths. These feeds usually boil in the gas oil range above about 340° C. and below about 650° C. Preferred feedstocks are vacuum gas oils with normal boiling ranges above about 340° C. and below about 600° C., and deasphalted residual oils having normal boiling ranges above about 480° C. and below about 650° C. Preferably, the feedstock will have a low sulfur content, on the order of less than 10 ppm sulfur and preferably less than 5 ppm sulfur, to minimize on-stream sulfiding of the nickel-tin catalyst. As mentioned previously, it has been found that an unsulfided catalyst provides superior oxidation stability relative to a sulfided catalyst. Reduced topped crude oils, shale oils, liquefied coal, coke distillates, flask or thermally cracked oils, atmospheric residua, and other heavy oils can also be used as the feed source.

The hydrocarbonaceous feed is hydrocracked using standard reaction conditions and catalysts. Hydrocracking can take place in one or more reaction zones and with or without initial denitrogenation or desulfurization steps.

Typically hydrocracking process conditions include temperatures in the range of 250° C. to 500° C., pressures in the range of 30 to 205 bar, or more, a hydrogen recycle rate of 100 to 1100 SCM/KL, and a LHSV (v/v/hr) of 0.1 to 50.

Catalysts used in the hydrocracking zone or zones include those having hydrogenation-dehydrogenation activity, and active cracking supports. The support is often a refractory inorganic oxide, such as silica-alumina, silica-alumina-zirconia and silica-alumina-titania composites, acid-treated clays, crystalline aluminosilicate zeolitic molecular sieves (such as Zeolite A, faujasite, Zeolite X, and Zeolite Y), and combinations of the above.

Hydrogenation-dehydrogenation components of the hydrocracking catalyst usually comprise metals selected from Group VIII and Group VI-B of the Periodic Table, and compounds including them. Preferred Group VIII components include cobalt and nickel and their oxides and sulfides. Preferred Group VI-B components are the oxides and sulfides of molybdenum and tungsten. Thus, examples of hydrocracking catalysts which are preferred for use in the hydrocracking step are the combinations nickel-tungsten-silica-alumina and nickel-molybdenum-silica-alumina.

The hydrocracked feed is optionally dewaxed. Dewaxing can be carried out by either conventional solvent dewaxing or catalytic dewaxing. Catalytic dewaxing is preferably carried out using intermediate pore size zeolites and standard reaction conditions. The intermediate pore size zeolites used in the dewaxing step are crystalline aluminosilicate zeolites having a silica to alumina mol ratio greater than about 10:1 and preferably greater than about 40:1. These zeolites can have useful dewaxing activity even at high silica:alumina mol ratios such as 200 to 500:1.

By "intermediate pore size" as used herein is meant an effective pore aperture in the range of about 5 to 6.5 Angstroms when the zeolite is in the H-form. Zeolites having pore apertures in this range tend to have unique molecular sieving characteristics. Unlike small pore zeolites, such as erionite, they will allow hydrocarbons having some branching into the zeolitic void spaces. Unlike large pore zeolites, such as the faujasites, they can differentiate between n-alkanes and slightly branched alkanes on the one hand and larger branched alkanes having, for example, quaternary carbon atoms.

Typical catalytic dewaxing conditions include a LHSV (v/v/hr) of 0.5 to 20, a temperature from about 260° C. to 610° C., amd a pressure from below atmospheric to several hundred bar. Where the feed to the dewaxing step has a wide boiling range, it is especially preferred to separate it into at least two fractions, where each fraction has a boiling range of greater than about 50° C. When a wide boiling range feed is catalytically dewaxed, the higher boiling portions tend to be under-dewaxed while the lower boiling portions tend to be overdewaxed. By splitting the feed to the dewaxing step, the different boiling range fractions can be dewaxed at different severities. After dewaxing, the separate streams can be recombined or processed separately.

Catalytic hydrogenation is conducted at temperatures ranging from about 170° C. to about 340° C., preferably from about 210° C. to about 300° C., at pressures from about 20 bar to about 225 bar, and at space velocities (LHSV) from about 0.1 to about 20. For maximum recovery of lubricating oil stock from the catalytic hydrogenation zone, it is preferred that the conversion be as low as possible consistent with stabilizing the oil. Conversion, unselective cracking by the nickel-tin catalyst, should be less than about 10 percent, preferably less than about 5 percent.

EXAMPLES

Example 1

The benefits of the present invention are illustrated by the following comparative Example utilizing two embodiments of the improved catalyst disclosed herein. This comparative Example has been carried out to demonstrate the excellent activity of the improved catalyst.

The Example was carried out using a solvent dewaxed hydrocrackate feed having the inspections shown in Table I.

TABLE I

| Dewaxed Hydrocrackate Feed Inspections | |
| --- | --- |
| Gravity, °API | 30.1 |
| Aniline Point, °F. | 210.7 |
| Sulfur, ppm | 19 |
| Nitrogen, ppm | 4 |
| Vis, cS, 40° C. | 91.62 |
| Vis, cS, 100° C. | 10.78 |
| V.I. | 105 |
| Distillation, °F. | |
| 5/30 | 898/921 |
| 50/70 | 935/951 |
| 90/EP | 987/1030 |

This feed was contacted with six different hydrogenation catalysts under identical conditions. Only the first two catalysts (catalysts a and b) are embodied by the present invention, the latter four catalysts (catalysts c–f) are representative of commercially available hydrogenation catalysts.

Catalysts a and b were prepared by impregnating a proprietary cogelled nickel-tin aluminosilicate, comprising 9.6 weight percent nickel and 3.4 weight percent tin with 0.2 weight percent palladium and 0.8 weight percent palladium, respectively. Catalyst c was the cogelled nickel-tin catalyst used to prepare catalysts a and b. Catalysts d and e were palladium aluminosilicate catalysts each comprising 0.8 weight percent palladium. Catalyst b was a sulfided proprietary nickel-tungsten aluminosilicate.

The hydrogenation (stabilization) reaction was carried out at a LHSV of 2, total pressure of 2200 psig, temperature of 500° F., and the hydrogen flow rate of about 8 MSCF (standard cubic feet) per barrel of feed.

Catalysts were activated by the following procedure. After loading catalyst in a 3/16-inch stainless steel reactor, with the remaining space filled with alundum, it was calcined in air for one hour at 850° F. The reactor was then placed in the clam-shell furnace of a hydrogenation pilot plant and brought up to 2200 psig in once-through $H_2$ at 50 vol. $H_2$/vol. catalyst/minute. The catalyst temperature was brought up to 400° F. for one hour, then raised to 500° C. for one hour, 600° F. for one hour, and 700° F. for two hours, after which it was lowered to 500° F. for 16 hours before beginning the run.

The degree of hydrogenation was determined by measuring the ultraviolet absorbance of the products at the wavelength of 226 nm using a Hewlett-Packard Model 8451 spectophotometer. The degree of hydrogenation could be estimated from the quotient $A_{226}$(feed)/$A_{226}$(product). This could then be fit into the following first-order rate expression:

$$\ln \ln \frac{A_{226} \text{ (feed)}}{A_{226} \text{ (product)}} = \ln k \frac{W}{F} - k_d t$$

where W is the weight of catalyst, F the flow rate of feed, t the time on-stream, and k and $k_d$ the reaction and deactivation rate constants, respectively.

FIG. 1 illustrates the results of the comparative Example, showing a higher degree of hydrogenation achieved by representative embodiments of the present invention.

Example 2

The 0.8% Pd on Ni-Sn catalyst of Example 1 was retested, but this time the reduction temperature prior to starting the run did not exceed 500° F. The catalyst was tested as before. Table II shows high activity for this catalyst when reduced at 500° F.

TABLE II

| $A_{226}$ (feed)/$A_{226}$ (product) of Oil Hydrofinished Over 0.8% Pd - Ni—Sn Catalyst of Example 1 | | |
|---|---|---|
| | $A_{226}$ (feed)/$A_{226}$ (product) | |
| Hours | 48 | 72 |
| Maximum Reduction Temperature, °F. | | |
| 700 | 229 | 53 |
| 500 | 196 | 49 |

The full scope of the invention is defined by the following claims.

What is claimed is:

1. In a process for stabilizing lubricating oil which comprises the steps of:
    (a) hydrocracking in a hydrocracking zone a hydrocarbonaceous feedstock; and
    (b) catalytically hydrogenating in a catalytic hydrogenation zone at least part of the effluent of said hydrocracking zone by contacting at least part of said hydrocracking zone effluent with a catalyst comprising nickel or compounds thereof, tin or compounds thereof, and a siliceous matrix;
    the improvement which comprises adding to said catalyst from about 0.03 percent by weight to about 1.0 percent by weight of palladium metal as a percentage of total catalyst weight.

2. The improved process of claim 1 wherein said process further comprises an additional step of dewaxing in a dewaxng zone at least part of the effluent of said hydrocracking zone prior to the catalytic hydrogenation step.

3. The improved process of claim 2 wherein said dewaxing is catalytic dewaxing with a dewaxing catalyst comprising an intermediate pore size zeolite.

4. A process for stabilizing lubricating oil which comprise the steps of:
    (a) hydrocracking in a hydrocracking zone a hydrocarbonaceous feedstock; and
    (b) catalytically hydrogenating in a catalytic hydrogenation zone at least part of the effluent of said hydrocracking zone by contacting at least part of said hydrocracking zone effluent with a catalyst comprising at least two hydrogenating components one of which is nickel or a compound thereof and the other of which is tin or a compound thereof and a siliceous matrix, said catalyst additionally comprising a component of palladium or a compound thereof; wherein the weight ratio of nickel to tin is from about 0.25 to 20 determined as metals and the combined weight percent of nickel and tin metal is from about 5 percent by weight to about 30 percent by weight of total catalyst, and the amount of said palladium component is within the range of from about 0.03 percent by weight to about 1.0 percent by weight determined as the weight percent of palladium metal in the total catalyst.

5. The process of claim 4 wherein said process further comprises the additional step of dewaxing in a dewaxing zone at least part of the effluent of said hydrocracking zone prior to the catalytic hydrogenation step.

6. The process according to claim 4 wherein said dewaxing is catalytic dewaxing with a dewaxing catalyst comprising an intermediate pore zeolite.

* * * * *